United States Patent
Mereu et al.

(10) Patent No.: US 8,302,163 B2
(45) Date of Patent: *Oct. 30, 2012

(54) SYSTEM AND METHOD FOR SECURE COMMUNICATION

(75) Inventors: Stephen Mereu, Ottawa (CA); Matt Schnarr, Ottawa (CA); Joseph Chin, Ottawa (CA)

(73) Assignee: Corel Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/825,044

(22) Filed: Jun. 28, 2010

(65) Prior Publication Data

US 2010/0268945 A1    Oct. 21, 2010

Related U.S. Application Data

(63) Continuation of application No. 10/252,872, filed on Sep. 23, 2002, now Pat. No. 7,752,434.

(60) Provisional application No. 60/324,191, filed on Sep. 21, 2001.

(51) Int. Cl.
*H04L 29/06* (2006.01)

(52) U.S. Cl. .............................. 726/3; 726/5

(58) Field of Classification Search .............. 726/3, 29, 726/5, 9, 10; 713/150, 161, 168; 709/229
See application file for complete search history.

(56) References Cited

U.S. PATENT DOCUMENTS

| | | | |
|---|---|---|---|
| 5,815,665 A | 9/1998 | Teper et al. | 395/200.59 |
| 5,845,267 A | 12/1998 | Ronen | 705/40 |
| 5,892,905 A * | 4/1999 | Brandt et al. | 726/11 |
| 6,035,281 A | 3/2000 | Crosskey et al. | 705/14 |
| 6,098,093 A | 8/2000 | Bayeh et al. | 709/203 |
| 6,141,758 A | 10/2000 | Benantar et al. | 713/201 |
| 6,173,407 B1 | 1/2001 | Yoon et al. | 713/201 |
| 6,178,457 B1 | 1/2001 | Pitchford et al. | 709/228 |
| 6,195,682 B1 | 2/2001 | Ho et al. | 709/203 |
| 6,212,192 B1 | 4/2001 | Mirashrafi et al. | 370/401 |
| 6,216,173 B1 | 4/2001 | Jones et al. | 709/302 |
| 6,233,577 B1 | 5/2001 | Ramasubramani et al. | 707/9 |
| 6,233,604 B1 | 5/2001 | Van Horne et al. | 709/203 |
| 6,286,104 B1 | 9/2001 | Buhle et al. | 713/201 |
| 6,292,827 B1 | 9/2001 | Raz | 709/217 |
| 6,304,915 B1 | 10/2001 | Nguyen et al. | 709/250 |
| 6,311,207 B1 | 10/2001 | Mighdoll et al. | 709/203 |
| 6,317,786 B1 | 11/2001 | Yamane et al. | 709/224 |
| 6,338,046 B1 | 1/2002 | Saari et al. | 705/34 |
| 6,338,089 B1 | 1/2002 | Quinlan | 709/227 |
| 6,343,284 B1 | 1/2002 | Ishikawa et al. | 705/67 |
| 6,343,323 B1 | 1/2002 | Kalpio et al. | 709/229 |
| 6,345,298 B1 | 2/2002 | Moriya | 709/228 |

(Continued)

OTHER PUBLICATIONS

"Developer Works: Web Services: Articles—Title" IBM Developer Works, pp. 1-2, Sep. 2001.

(Continued)

*Primary Examiner* — Ali Abyaneh
(74) *Attorney, Agent, or Firm* — Mark J. Danielson; Pillsbury Winthrop Shaw Pittman LLP

(57) ABSTRACT

A secure communication module is provided for securing communication between a client application and a network service. The secure communication module comprises an authentication identifier provider for providing the client application a pool of authentication identifiers for use in subsequent communication with the network service, and an authentication identifier validator for checking the validity of an authentication identifiers from the pool of authentication identifiers sent with the subsequent communication.

20 Claims, 3 Drawing Sheets

U.S. PATENT DOCUMENTS

| | | | | |
|---|---|---|---|---|
| 6,986,040 | B1* | 1/2006 | Kramer et al. | 713/155 |
| 2001/0007127 | A1 | 7/2001 | Staring | 713/160 |
| 2001/0027449 | A1 | 10/2001 | Wright | 705/412 |
| 2001/0034841 | A1* | 10/2001 | Shambroom | 713/201 |
| 2002/0007376 | A1 | 1/2002 | Popp et al. | 707/513 |
| 2002/0010776 | A1 | 1/2002 | Lerner | 709/225 |
| 2002/0010803 | A1 | 1/2002 | Oberstein et al. | 709/318 |
| 2002/0013849 | A1 | 1/2002 | Schweitzer et al. | 709/227 |
| 2002/0016843 | A1 | 2/2002 | Schweitzer et al. | 709/227 |
| 2002/0016922 | A1 | 2/2002 | Richards et al. | 713/200 |
| 2002/0026519 | A1 | 2/2002 | Itabashi et al. | 709/229 |
| 2003/0014631 | A1* | 1/2003 | Sprague | 713/168 |
| 2004/0015703 | A1* | 1/2004 | Madison et al. | 713/185 |

OTHER PUBLICATIONS

"Developer Works: Web Services: Articles, Columns & Tips" IBM Developer Works, pp. 1-7, Nov. 2001.

"Developer Works: Web Services: Articles, Columns & Tips-Title" IBM Developer Works, pp. 1-11, Dec. 2002.

"Web services provisioning" Polan, IBM Developer Works, pp. 1-8, Jan. 2002.

"The Advertisement and Discovery of Services (ADS) protocol for Web services Simplifying the announcement of available Web Services to inquiring software agents" Nagy et al. IBM Developer Works, pp. 1-6, Oct. 2000.

"Applying Web services to the application service provider environment an example of Web services applied to e-business" Flurry, IBM Developer Works, pp. 1-9. Jan. 2001.

"Applying Web Services to the Application Service Provider Environment, Part 2 An Example of Web Services Applied to e-Business" Flurry, IBM Developer Works, pp. 1-10, Jan. 2001.

"Web Service networks" Truelove, IBM Developer Works, pp. 1-4, Oct. 2001.

"Energize e-business with Web services from the IBM WebSphere software platform" developerWorks staff, IBM Developer Works, pp. 1-4, Nov. 2000.

"IBM's Web Services architecture debuts" Fisco, IBM Developer Works, pp. 1-8, Sep. 2000.

"Myths and misunderstandings surrounding SOAP" Cohen, IBM Developer Works, pp. 1-4, Sep. 2001.

"Performance testing SOAP-based applications" Cohen, IBM Developer Works, pp. 1-9, Nov. 2001.

"The Python Web services Developer, Part 1 the World of Python Web services" Olson et al., IBM Developer Works, pp. 1-5, Jan. 2001.

"The Python Web Services Develper, Part 2 Web Services Software Repository, Part 1" Olson et al., IBM Developer Works, pp. 1-4, Mar. 2001.

"The Python Web services developer, Part 3: Web services software repository, Part 2" Olson et al., IBM Developer Works, pp. 1-8, Apr. 2001.

"The Python Web services developer, Part 4: Web services software repository, Part 3" Olson et al, IBM Developer Works, pp. 1-9, Jul. 2001.

"The Python Web services developer: Python SOAP libraries" Olson et al., IBM Developer Works, pp. 1-8, Sep. 2001.

"Repurposing CGI applications with SOAP" Johnston, IMB Developer Works, pp. 1-10, May 2001.

"The role of private UDDI nodes in Web services, Part 1: Six species of UDDI" Graham, IBM Developer Works, pp. 1-4, May 2001.

"SMS: Case study of a Web services deployment" Laird, IBM Developer Works, pp. 1-4, Aug. 2001.

"SOAP security extentions: digital signature" Hada, IBM Developer Works, pp. 1-6, Aug. 2001.

"Supercharging WSDL with RDF" Ogbuji, IBM Developer Works, pp. 1-5, Nov. 2000.

"The WS-Inspection and UDDI Relationship" Nagy et al. IBM Developer Works, pp. 1-4, Nov. 2001.

"UDDI4J: Matchmaking for Web services" Tidwell, IBM Developer Works, pp. 1-4, Jan. 2001.

"Understanding WSDL in a UDDI registry, Part 1" Brittenham et al., IBM Developer Works, pp. 1-12, Sep. 2001.

"Understanding WSDL in a UDDI registry, Part 2" Brittenham, IBM Developer Works, pp. 1-22, Sep. 2001.

"Using SOAP:: Lite with Peri" Johnston, IBM Developer Works, pp. 1-5, May 2001.

"Using WSDL in SOAP applications an introduction to WSDL for SOAP programmers" Ogbuji, IBM Developer Works, pp. 1-6, Nov. 2000.

"Using XML-RPC for Web services: Getting started with XML-RPC in Perl" Johnston, IBM Developer Works, pp. 1-6, Mar. 2001.

"Using XML-RPC for Web services: XML-RPC Middleware" Johnston, IBM Developer Works, pp. 1-6, Mar. 2001.

"Web services and XML technologies CD" staff, IBM Developer Works, pp. 1-4, Sep. 2001.

"Web Services architecture overview The next stage of evolution for e-business" IBM Web Services Architecture Team, IBM Developer Works, pp. 1-8, Sep. 2000.

"Web services architect, Part 1: An introduction to dynamic e-business" Gisolfi, IBM Developer Works, pp. 1-6, Apr. 2001.

"Web services architect, Part 2: Models for dynamic e-business" Gisolfi, IBM Developer Works, pp. 1-4, Apr. 2001.

"Web services architect, Part 3: Is Web services the reincarnation of COBRA?" Gisolfi, IBM Developer Works, pp. 1-7, Jul. 2001.

"The Web services (r)evolution, Part 4 Web Services Description Language (WSDL)" Glass, IBM Developer Works, pp. 1-5, Feb. 2001.

"Web services architect, Part 5: Inhibitors to fee-based Web services" Gisolfi, IBM Developer Works, pp. 1-3, Oct. 2001.

"The Web services architect: Catalysts for fee-bsed Web services" Gisolfi, IBM Developer Works, pp. 1-6, Nov. 2001.

"Web services checkpoint" Smith, IBM Developer Works, pp. 1-2, Nov. 2000.

"Web services improves employee benefits processing" Whitlock et al., IBM Developer Works, pp. 1-6, Oct. 2001.

"The Web services insider, Part 10: Digging into the issues" Snell, IBM Developer Works, pp. 1-4, Nov. 2001.

"Web services insider, Part 1: Reflections on SOAP" Snell, IBM Developer Works, pp. 1-5, Apr. 2001.

"The Web services insider, Part 2: A summary of the W3C Web Services Workshop" Snell, IBM Developer Works, pp. 1-4, Apr. 2001.

"The Web services insider, Part 3: Apache and Microsoft—playing nice together" Snell, IBM Developer Works, pp. 1-6, May 2001.

"The Web services insider, Part 4: Introducing the Web Services Flow Language" Snell, IBM Developer Works, pp. 1-6, Jun. 2001.

"The Web services insider, Part 5: Getting into the flow" Snell, IBM Developer Works, pp. 1-6, Jul. 2001.

"The Web services insider, Part 6: Assuming responsibility" Snell, IBM Developer Works, pp. 1-5, Jul. 2001.

"Web services insider, Part 7: WSFL and recursive composition" Snell, IBM Developer Works, pp. 1-6, Jul. 2001.

"The Web services insider, Part 8: Soapy decisions" Davis, IBM Developer Works, pp. 1-5, Aug. 2001.

"Web services insider, Part 9: Digging into the issues" Snell et al., IBM Developer Works, pp. 1-4, Sep. 2001.

"Web service invocation sans SOAP" Mukhi, IBM Developer Works, pp. 1-6, Sep. 2001.

"Web service invocation sans SOAP, Part 2: The architecture of Web Service Invocation Framework" Mukhi et al., IBM Developer Works, pp. 1-8, Sep. 2001.

"The Web services (r)evolution: Part 1" Glass, IBM Developer Works, pp. 1-3, Nov. 2000.

"The Web services (r)evolution: Part 2" Glass, IBM Developer Works, pp. 1-10, Dec. 2000.

"The Web services (r)evolution: Part 3" Glass, IBM Developer Works, pp. 1-9, Jan. 2001.

"The Web services (r)evolution: Part 4" Glass, IBM Developer Works, pp. 1-11, Feb. 2001.

"The Web Services TestArea" Shah, IBM Developer Works, pp. 1-4, May 2001.

"WSDL processing with XSLT" Ogbuji, IBM Developer Works, pp. 1-4, Nov. 2000.

"Authentication and Authorization" Kirtland, msdn.microsoft.com, pp. 1-8, Feb. 2001.

"Favorites Service Overview" Kritland, msdn.microsoft.com, pp. 1-5, Updated Aug. 2001.

"Metering and accounting for Web services" Kuebler et al., IBM Developer Works, pp. 1-7, Jul. 2001.

"Web Services Interoperability and SOAP" Ballinger, msdn.microsoft.com, pp. 1-3, May 2001.

"Oracle Dynamic Services: Oracle's Web Services Framework" Srivastava, Oracle Corporation Position Pater of Web Services pp. 1-5, Nov. 2001.

"Simple Object Access Protocol (SOAP) 1.1" Box et al., pp. 1-35, May 2000.

* cited by examiner

SYSTEM AND METHOD FOR SECURE COMMUNICATION

CROSS-REFERENCE TO RELATED APPLICATIONS

This application is a continuation of U.S. patent application Ser. No. 10/252,872 filed Sep. 23, 2002, now U.S. Pat. No. 7,752,434, which claims priority from U.S. Provisional Application No. 60/324,191 filed Sep. 21, 2001.

FIELD OF THE INVENTION

This invention relates to distributed computing, where software running on a client system interacts with software running on remote server systems. In particular, the invention relates to a system and method for secure communication.

BACKGROUND OF THE INVENTION

Software developers wish to provide programmatic functionality over the Internet through the creation of web services. These web services provide some valuable technology in which the developer has expertise. Web services are often deployed in such a way that the user of the web service has a direct connection with a server.

One problem that arises from this process of exposing the web services for consumption over the web by an end user application is that in order to protect unauthorized access of these web services over the Internet, the web services must somehow incorporate authentication and authorization of users and other security measures. When a user wishes to use a web service on a server, the server usually needs to ensure that the user is authorized to have access. This authentication of the user is typically done by sending the user's name and password to the server which then verifies the given data before granting access. Since the authentication data is sensitive, it is desirable to be sent over a secured channel, such as the hypertext transfer protocol over secure socket layer (https), which encrypts the data. Using a secured channel is safer but slower than an unsecured channel since it requires the extra encryption/decryption steps.

An alternative solution is to have the user log into the web service once by sending the user name and password over the secure channel and in return the user will receive a unique authentication identifier (ID) over the secured channel. Sometimes an authentication ID is called a session ID. However, there is a distinction between a session ID that refers to a locked communication between a client and a server and a session ID that refers to the fact that authentication has occurred. Thus, the term authentication ID will be used in this specification.

Successive calls to the web service are then made over an unsecured channel with the authentication ID to identify the user. Since the user name and password are not sent during the successive calls, the calls no longer needs to be done over a secure channel. The calls can be sent over an unencrypted channel, such as the hypertext transfer protocol (http). This will improve performance as well as limit the number of times that the user name and password are sent. When the server receives a web service call, it will authorize the user by verifying that the authentication ID is valid at that point in time.

This use of an authentication ID is only partially acceptable since the user name and password are safe as they are passed over the secure channel once and the user can still be authenticated for access to web services using the authentication ID. The problem is that since the web service calls are not done over a secured channel, the authentication ID could be compromised. Anyone who is observing the unsecured channel could note the authentication ID as it is used in the web service calls. They could then reuse this authentication ID and gain unauthorized access to the web service.

One adaptation to the use of an authentication ID is to have the authentication ID time out after a certain period of time. Once an authentication ID has expired, anyone who has obtained it with or without authorization will no longer be able to use it and the authorized user will have to log on again and receive a new authentication ID.

While the time-out of an authentication ID solution is better than no solution, there is still the problem that a misuse of a web service may occur for a limited time. It is desirable to provide means for providing better security when providing services over a network.

SUMMARY OF THE INVENTION

It is an object of the invention to provide a novel system and method for providing better security when providing services over a network. The novel system and method will obviate or mitigate at least one of the disadvantages of existing systems.

In an aspect of the present invention, there is provided a secure communication module for securing communication between a client application and a network service. The secure communication module comprises an authentication identifier provider for providing the client application a pool of authentication identifiers for use in subsequent communication with the network service, and an authentication identifier validator for checking the validity of an authentication identifiers from the pool of authentication identifiers sent with the subsequent communication.

In another aspect of the present invention, there is provided a method for securing communication between a client application and a network service. The method comprises steps of providing the client application a pool of authentication identifiers for use in subsequent communication with the network service, and checking the validity of an authentication identifiers from the pool of authentication identifiers sent with the subsequent communication.

In another aspect of the present invention, there is provided computer readable media storing the instructions and/or statements for use in the execution in a computer of a method for securing communication between a client application and a network server. The method comprises steps of providing the client application a pool of authentication identifiers for use in subsequent communication with the network service, and checking the validity of an authentication identifiers from the pool of authentication identifiers sent with the subsequent communication.

In another aspect of the present invention, there is provided electronic signals for use in the execution in a computer of a method for securing communication between an client application and a network server. The method comprises steps of providing the client application a pool of authentication identifiers for use in subsequent communication with the network service, and checking the validity of an authentication identifiers from the pool of authentication identifiers sent with the subsequent communication.

In another aspect of the present invention, there is provided a computer program product for use in the execution in a computer of a method for securing communication between an client application and a network server. The computer program product comprises an authentication identifier provider for providing the client application a pool of authentication identifiers for use in subsequent communication with the network service, and an authentication identifier validator for checking the validity of an authentication identifiers from the pool of authentication identifiers sent with the subsequent communication.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

This description contains references to login and logon procedures. The embodiments of the inventions described in this specification apply to both login and logon procedures. A login reference is intended to include a logon reference and vice versa.

Figure 1:
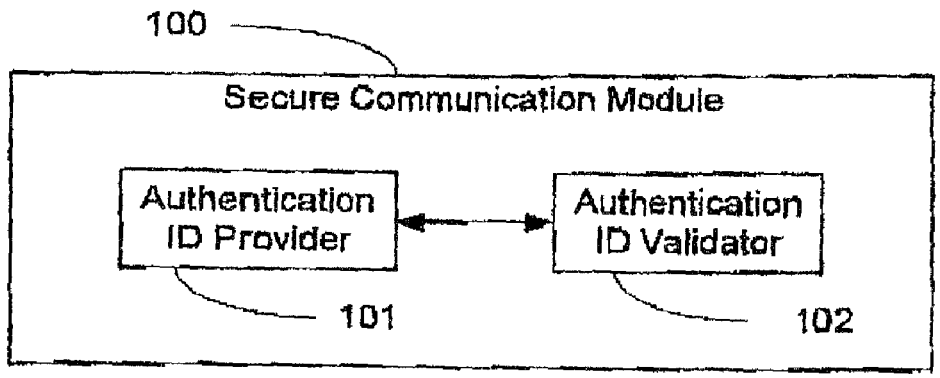
FIG. 1 shows an example of a secure communication module in accordance with an embodiment of the present invention.

FIG. 1 shows a secure communication module 100 in accordance with an embodiment of the present invention. An aspect of the secure communication module 100 relates to the use of a pool of authentication IDs during network communication. The pool of authentication IDs contains a plurality of authentication IDs. The secure communication module 100 comprises an authentication identifier (ID) provider 101 and an authentication ID validator 102. The authentication ID provider 101 assigns a pool of authentication IDs to a client application when the client application logs onto a network service such as a web service. The authentication ID validator 102 authenticates authentication IDs. The authentication IDs may be passed as parameters during network communication, as will be described below. The authentication ID provider 101 and the authentication ID validator 102 may comprise software code or code embedded in hardware. Other components may be added to the secure communication module 100, including a communication module for receiving and sending communication.

The user of a client application logs onto a network service by sending client application credentials, typically a user name and password, over a secured channel as described above. In return, the client application receives a group or pool of authentication IDs. The pool of authentication IDs returned is secure since the pool is sent back over the secured channel. The exact number of IDs returned may vary depending on the system administration requirements for the network service 21. Once the client application has this pool of authentication IDs, the client application may use a different authentication ID with each successive method call to the network service 21. The authentication ID that is used expires upon use so that it can not be reused. This means that even if an eavesdropper is able to compromise an authentication ID, the eavesdropper will not be able to use it since it can only be used once.

After the client application has used up all the authentication IDs in the pool that was given, the client application may log on again to receive another pool of authentication IDs. No one other than the client application is able to use the authentication IDs since the authentication IDs are always given to the client application over a secured channel and they expire upon use. Each authentication ID is not compromised during or after its use over an unsecured channel because an unauthorized person who manages to capture an authentication ID over an unsecured channel only receives an expired authentication ID.

Further security features may be added to the pool of authentication IDs. For example, unused authentication IDs in a pool of authentication IDs can be set to expire after a preset event such as the expiry of a period of time.

Figure 2:
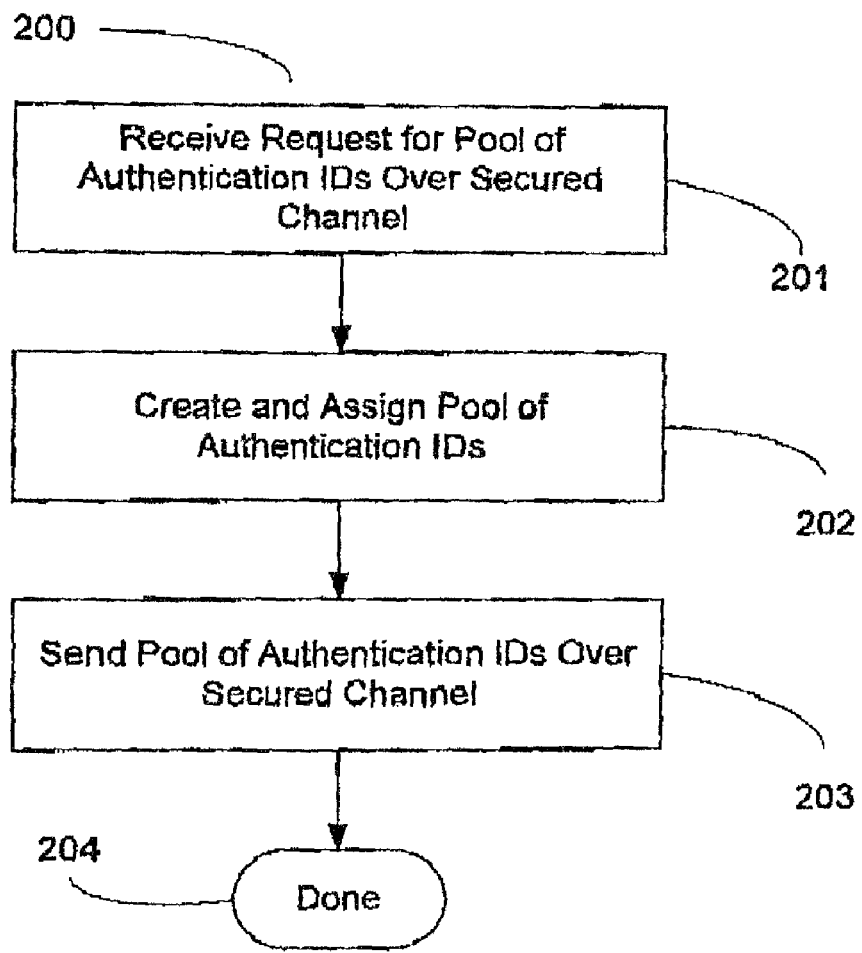
FIG. 2 is a flowchart showing a method for providing a pool of authentication identifiers in accordance with an embodiment of the present invention.

FIG. 2 shows a method for providing a pool of authentication IDs (200) for use in network communication. The method begins with the secure communication module 100 receiving a request for a pool of authentication IDs (201) over a secured channel. Typically, the request will come from a user using a client application 15. The authentication ID provider 101 creates and assigns a pool of authentication IDs (202). The authentication IDs may be passed as parameters by the client application during network communication. The authentication IDs may be created and assigned by code in the authentication ID provider 101. The client application is sent the pool of authentication. IDs (203) over a secured channel and the method is done (204). The client application may now use the authentication IDs.

Figure 3:
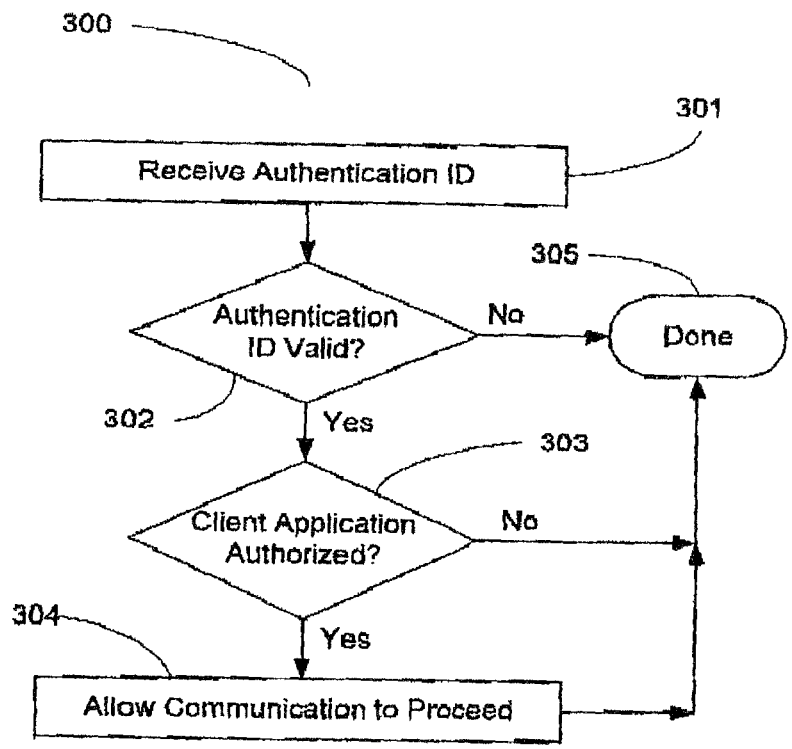
FIG. 3 is a flowchart showing a method for using a pool of authentication identifiers in accordance with an embodiment of the present invention.

FIG. 3 shows a method for using a pool of authentication IDs. During subsequent network communication over an unsecured channel such as http, an authentication ID from the pool of authentication IDs is sent as a parameter in the communication. The authentication ID is received by the secure communication module 100 (301) and passed to the authentication ID validator 102. If the authentication ID is not valid (302), then the communication is not allowed to proceed and the method is done (305). If the authentication ID is valid (302), then the next step is to check whether the client application (or user) is authorized to send the communication (303). If the client application is not authorized (303), then the communication is not allowed to proceed and the method is done (305). If the client application is authorized (303), then the communication is allowed to proceed (304) and the method is done (305). Alternatively, an error message may be returned to the client application when the communication is not allowed to proceed.

As described above, the authentication ID provider 102 may comprise code which assigns a pool of authentication IDs to a client application when the client application logs into a network service. These authentication IDs are passed as parameters in network service calls. The authentication ID validator 102 may comprise code to validate the authentication ID. The authentication code may be implemented in a number of ways. In an example of an embodiment of the present invention, a working table mapping is created when the client application is authenticated (i.e., client credentials are correct and the pool of authentication IDs are returned). An authentication ID is checked every time a network service is called, then deleted if the client application logs off or the authentication ID expires. An alternative of using a hashing system would require care to remain as secure.

Another aspect of an embodiment of the invention relates to the authentication of a client to gain access to the web services that are hosted by a remote server. Preferably, the secure communication module 100 is independent from the platforms on which web services are hosted. Furthermore, the secure communication module 100 is preferably independent from the protocol used to access those web services.

Figure 4:
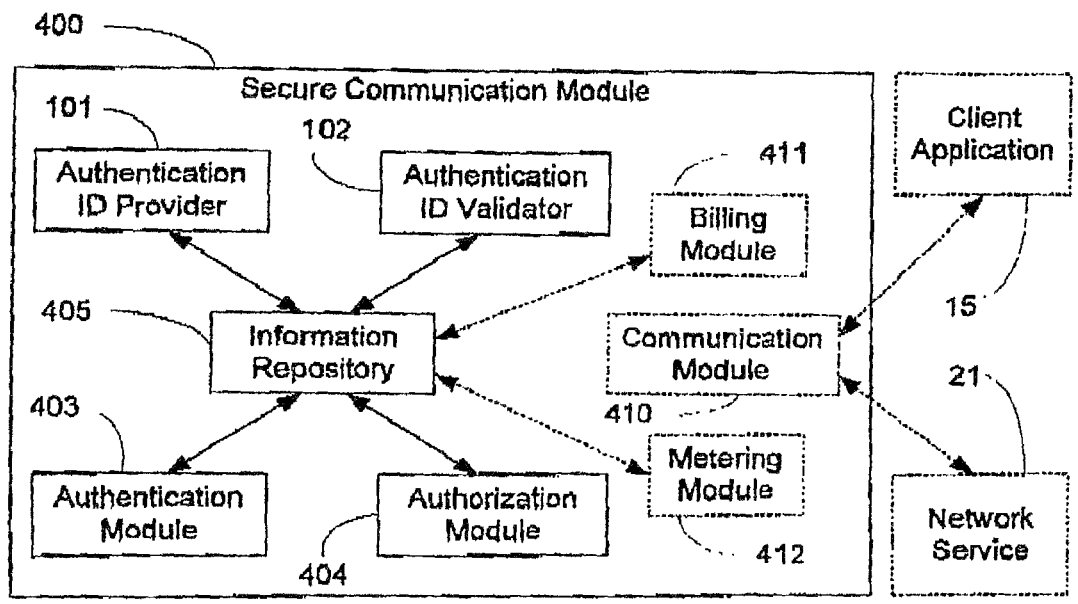
FIG. 4 shows another example of a secure communication module, in an example of a secure communication environment, in accordance with an embodiment of the present invention.

FIG. 4 shows another example of a secure communication module 400 in an example of a secure communication environment 450 in accordance with an embodiment of the present invention. The secure communication module 400 comprises an authentication ID provider 101, an authentication ID validator 102, an authentication module 403, an authorization module 404, and an information repository 405. The authentication ID provider 101 and the authentication ID validator 102 are similar to those described above. The authentication module 403 and the authorization module 404 authenticate and authorize a client application 15 used by a user or developer of network services such as web services. The authentication typically takes place during a login procedure. The authentication module 403 and the authorization module 404 may comprise software code or code embedded in hardware. The information repository 405 contains information used to authenticate and authorize client applications 15, as well as storing authentication ID allocations. The information repository 405 may be a database. The authentication ID provider 101, authentication ID validator 102, authentication module 403, and authorization module 404 are connected to the information repository 405 and may be accessed by an external communication module.

Components may be added or removed from the secure communication module 400. For example, a communication module 410 may be included to receive and send communication with external client applications 15 or network services 21. Furthermore, a billing module 411 may be added to the secure communication module 400 to charge users using client applications 15 and network service providers such web service providers for the pool of authentication IDs and the use of the pool of authentication IDs.

Client applications 15 may be charged based upon the size of the pool of authentication IDs. Packages of authentication IDs may be available for a client application 15 to order. For example, a client application 15 may order a basic package of 100 authentication IDs, or a premium package of 1000 authentication IDs. Other sizes of packages may be preset. A client application 15 may also be prompted by the authentication ID provider to enter the number of authentication IDs in the pool of authentication IDs.

Alternatively, the billing module may charge based upon use of an authentication ID. In such a scenario, a metering module 412 is added to the secure communication module 400 to track and record usage of the pool of authentication IDs. The information collected by the metering module 412 is stored in the information repository.

The secure communication environment 450 comprises a client application 15, the secure communication module 400, and a network service 21. The client application 15 and the network service 21 communicate through the communication module 410. The communication module 410 also communicates (not shown) with the components of the secure communication module 400. Alternatively, the communication module 410 may be located remotely on another server.

Figure 5:
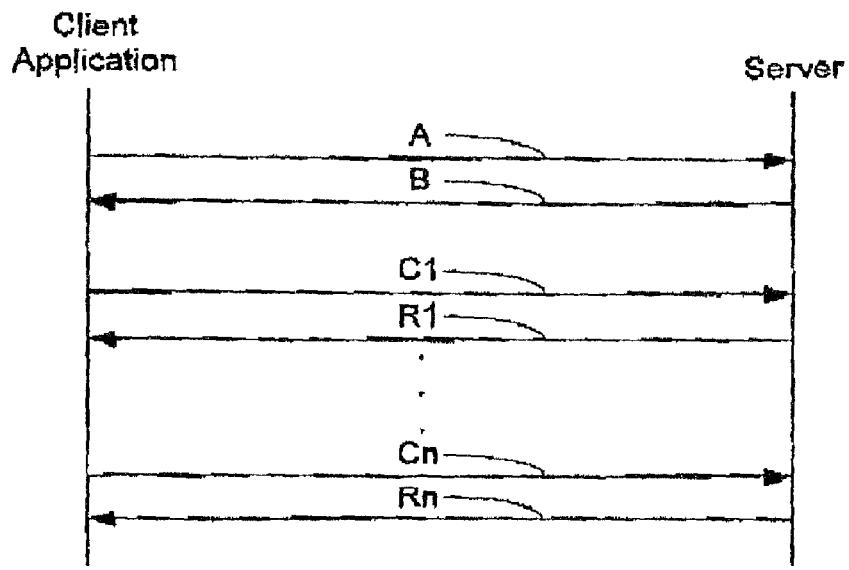
FIG. 5 shows a sequence of events to log into and make web service calls in accordance with an embodiment of the invention.

FIG. 5 shows an example of a sequence of logging into a network service such as a web service and using the pool of authentication IDs. In FIG. 5, the sequences are listed as A, B, C1, R1, . . . , Cn, Rn, where n is an integer greater than one. The step "A" represents a client application 15 sending client application credentials, such as a user name and password over a secured channel, such as hypertext transfer protocol over secure socket layer (https). The step "B" represents the server authenticating the client application 15 and returning a pool of n authentication IDs over the secured channel. The steps "C1" to "Cn" represent the client application 15 making up to n web service calls over an unsecured channel using a different authentication ID from the pool of n authentication IDs returned. Each authentication ID will expire upon use. The steps "R1" to "Rn" represent the server validating the authentication ID used and returning the result of the web service call to the client application 15. There is no step R, i.e., no response, if a web service call does not require a response.

Figure 6:
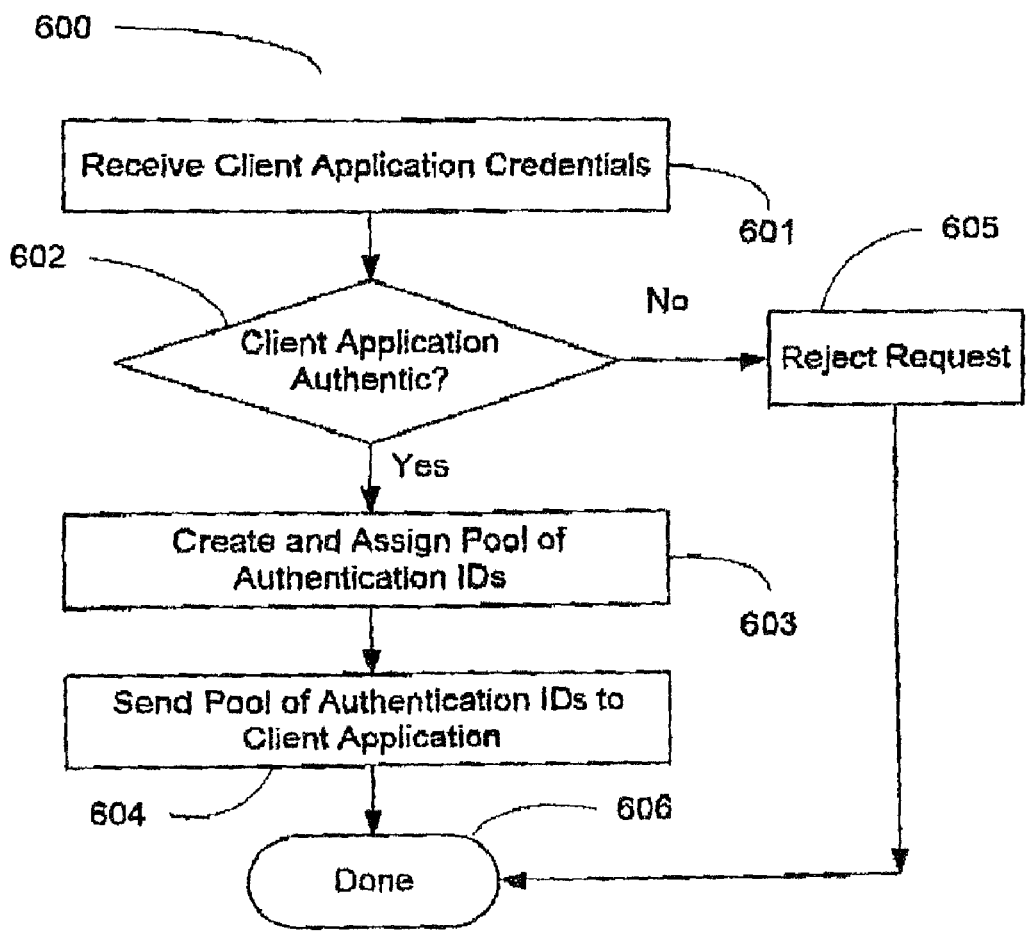
FIG. 6 is a flowchart showing another method for providing a pool of authentication identifiers in accordance with an embodiment of the present invention.

FIG. 6 shows a method for providing a pool of authentication IDs (600) for use in network communication. The method begins with the secure communication module 400 receiving a request for a pool of authentication IDs from a client application 15 requesting the use of a network service, such as a web service. Specifically, the secure communication module 400 receives client application credentials over a secured channel (601). The client application credentials are passed to the authentication module 403 to authenticate the client application 15 (602). The authentication module 403 may reference the information repository 405 when authenticating the client application 15. If the client application 15 is not authentic (602), i.e., the client application credentials are incorrect, then the request is rejected (605). If the client application 15 is authentic (602), then the request is passed to the authentication ID provider 101. The authentication ID provider 101 creates and assigns a pool of authentication IDs and sends the pool of authentication IDs to the client application 15 (603) over a secured channel. The pool of authentication IDs may be parameters passed as parameters by the client application 15 when invoking method calls of the requested network service 21. The authentication IDs may be created and assigned by code in the authentication ID provider 101. Alternatively, a bank of authentication IDs may be stored in the information repository 405 to be assigned by the authentication. ID provider 101. The client application 15 is sent the pool of authentication IDs (604) and the method is done (606). The client application 15 may now use the pool of authentication IDs. Other steps may be added to the method (600), such as billing users using client applications 15 or network service providers, such as web service providers, for the authentication IDs or the use of authentication IDs. As described above, client applications 15 may be billed based upon the amount of authentication IDs in the pool of authentication IDs. Furthermore, the usage of the authentication IDs may be tracked and metered for billing client applications 15 on a per use basis.

The assignment of the pool of authentication IDs may be registered in the information repository 405. Alternatively, the assignment of the pool of authentication IDs may be registered with the authentication ID validator 102. The registration of the pool of authentication IDs may be in the form of a file containing the assigned pool of authentication IDs, their status, such as used and not used, and client application credentials information, such as the user name and password. Other information may be added to the registration file as desired. The registration file may be referenced by the authentication ID validator 102 when the client application 15 uses each authentication ID.

The pool of authentication IDs is valuable to the client application 15 by providing extra security to prevent misuse of the web service for which the client application 15 is paying. It is also good for the network services provider or host, such as a web services provider, since network services access will be more secure which may be a requirement to gain contracts with certain clients.

Either secure communication module 100 or 400 according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. An authentication apparatus for authenticating communication between a client and one or more web services, the authentication apparatus comprising:
    a non-transitory computer readable memory storing instructions; and
    a processor for executing the instructions stored in the computer readable memory, the instructions when executed by the processor causing the processor to perform authentication tasks including:
    providing to a client application executed on the client a plurality of authentication identifiers over a secure communication channel established over a network, individual authentication identifiers of the plurality of authentication identifiers for use in validating subsequent client application requests to access functionality provided by a web service, wherein the secure communication channel is an encrypted communication channel;
    receiving, over an unsecure communication channel established over the network, a client application request to access a functionality provided by the web service and an associated authentication identifier from the plurality of authentication identifiers, wherein the unsecure communication channel is an unencrypted communication channel;
    validating an authorization for the client application to access the requested functionality of the web service using the associated authentication identifier from the plurality of authentication identifiers received with the client application request to access the functionality provided by the web service; and
    sending the request to access the functionality to the web service when the client application authorization to access the functionality of the web service is validated.

2. The authentication apparatus of claim 1, wherein each authentication identifier is invalidated after being validated, whereby each authentication identifier can only be used once.

3. The authentication apparatus of claim 1, wherein the instructions when executed by the processor further cause the processor to perform authentication tasks including:
    authenticating the client application prior to providing the client application the plurality of authentication identifiers.

4. The authentication apparatus of claim 1, wherein the instructions when executed by the processor further cause the processor to perform authentication tasks including: checking if the client application has authorization to access the functionality of the web service.

5. The authentication apparatus of claim 1, further comprising a repository for storing information relating to the plurality of authentication identifiers.

6. The authentication apparatus of claim 5, wherein the repository further stores information relating to the client application, and the web service.

7. The authentication apparatus of claim 1, wherein the instructions when executed by the processor further cause the processor to perform authentication tasks including: billing for the plurality of authentication identifiers.

8. The authentication apparatus of claim 1, wherein the instructions when executed by the processor further cause the processor to perform authentication tasks including: tracking usage of the plurality of authentication identifiers.

9. A system for authenticating communication over a network comprising:
    a client computing device coupled to the network, the client computing device executing a client application for receiving a plurality authentication identifiers over a secure communication channel through the network and sending over an unsecure communication channel through the network a client application request to access a functionality provided by a web service and an associated authentication identifier from the plurality of authentication identifiers;
    the web service coupled to an authentication apparatus through the network for receiving the request to access the functionality of the web service; and
    an authentication server coupled to the network for:
    providing the plurality of authentication identifiers to the client application over the secure communication channel established through the network, individual authentication identifiers of the plurality of authentication identifiers for use in validating subsequent client application requests to access functionality provided by the web service, wherein the secure communication channel is an encrypted communication channel;
    receiving, over the unsecure communication channel established through the network, the client application request to access the functionality provided by the web service and the associated authentication identifier from the plurality of authentication identifiers, wherein the unsecure communication channel is an unencrypted communication channel;
    validating an authorization for the client application to access the requested functionality of the web service using the associated authentication identifier from the plurality of authentication identifiers received with the client application request to access the functionality provided by the web service; and
    sending the request to access the functionality of the web service when the client application authorization to access the functionality of the web service is validated.

10. The system of claim 9, wherein each authentication identifier is invalidated after being validated by the authentication validator, whereby each authentication identifier can only be used once.

11. The system of claim 9, wherein the authentication server is further coupled to the network for:
    authenticating the client application prior to providing the client application the plurality of authentication identifiers.

12. The system of claim 9, wherein the authentication server is further coupled to the network for:
  checking if the client application has authorization to access the functionality of the web service.

13. The system of claim 9, wherein the authentication apparatus further comprises a repository for storing information relating to the plurality of authentication identifiers.

14. The system of claim 13, wherein the repository further stores information relating to the client application, and the web service.

15. The system of claim 9, wherein the authentication server is further coupled to the network for: billing for the plurality of authentication identifiers.

16. The system of claim 9, wherein the authentication server is further coupled to the network for: tracking usage of the plurality of authentication identifiers.

17. The system of claim 9, wherein the communication module of the authentication apparatus further receives a response from the web service and sends the response back to client.

18. A method of authenticating communication between a client and a web service, the method comprising:
  sending, from the client, client application credentials over a secure communication channel;
  receiving and authenticating, at a server, the client application credentials;
  providing a plurality of authentication identifiers to the client over the secure communication channel established through a network, individual authentication identifiers of the plurality of authentication identifiers for use in validating subsequent client application requests to access functionality provided by a web service, wherein the secure communication channel is an encrypted communication channel; receiving at the client the plurality of authentication identifiers;
  sending a client application request to access a functionality provided by the web service, the request including an associated authentication identifier from the plurality of received authentication identifiers;
  receiving, over an unsecure communication channel established through the network, the client application request to access the functionality provided by the web service and the associated authentication identifier, wherein the unsecure communication channel is an unencrypted communication channel;
  validating an authorization for the client application to access the requested functionality of the web service using the associated authentication identifier from the plurality of authentication identifiers received with the client application request to access the functionality provided by the web service; and
  sending the request to access the functionality of the web service when the client application authorization to access the web service is validated.

19. The method of claim 18, further comprising:
receiving at the web service the web service request;
processing at the web service the web service request;
sending a web service response to the server in response to the received web service request; receiving the web service response at the server; and
sending the web service response to the client.

20. The method of claim 19, further comprising:
sending a second client application request to access the web service with a second associated authentication identifier from the plurality of received authentication identifiers.

* * * * *

UNITED STATES PATENT AND TRADEMARK OFFICE
CERTIFICATE OF CORRECTION

| | | |
|---|---|---|
| PATENT NO. | : 8,302,163 B2 | Page 1 of 1 |
| APPLICATION NO. | : 12/825044 | |
| DATED | : October 30, 2012 | |
| INVENTOR(S) | : Mereu et al. | |

It is certified that error appears in the above-identified patent and that said Letters Patent is hereby corrected as shown below:

On Page 2, in Field (56), under "OTHER PUBLICATIONS", in Column 1, Line 30, delete "Develper," and insert -- Developer, --, therefor.

On Page 2, in Field (56), under "OTHER PUBLICATIONS", in Column 1, Line 47, delete "extentlons:" and insert -- extensions: --, therefor.

On Page 2, in Field (56), under "OTHER PUBLICATIONS", in Column 2, Line 5, delete "SOAP::" and insert -- SOAP: --, therefor.

On Page 2, in Field (56), under "OTHER PUBLICATIONS", in Column 2, Line 30, delete "fee-bsed" and insert -- fee-based --, therefor.

On Page 2, in Field (56), under "OTHER PUBLICATIONS", in Column 2, Line 70, delete "TestArea"" and insert -- Test Area" --, therefor.

In Column 2, Line 55, delete "an" and insert -- a --, therefor.

In Column 2, Line 65, delete "an" and insert -- a --, therefor.

In Column 4, Line 11, delete "up" and Insert -- up, --, therefor.

In Column 4, Line 37, delete "authentication." and insert -- authentication --, therefor.

In Column 4, Line 58, delete "102" and insert -- 101 --, therefor.

In Column 6, Line 44, delete "authentication." and insert -- authentication --, therefor.

Signed and Sealed this
Nineteenth Day of February, 2013

Teresa Stanek Rea
*Acting Director of the United States Patent and Trademark Office*